Aug. 8, 1950 H. R. GILCHRIST, JR., ET AL 2,517,998
APPARATUS FOR DIFFUSING WATER
IN EVAPORATION COOLERS
Filed Dec. 15, 1947 2 Sheets-Sheet 1

Harry R. Gilchrist
Don Hagman Young, INVENTORS.

BY Edwin M. Thomas

ATTORNEY.

Aug. 8, 1950  H. R. GILCHRIST, JR., ET AL  2,517,998
APPARATUS FOR DIFFUSING WATER
IN EVAPORATION COOLERS

Filed Dec. 15, 1947  2 Sheets-Sheet 2

Harry R. Gilchrist
Don Hagman Young, INVENTORS.

BY *Edwin M. Thomas*

ATTORNEY

Patented Aug. 8, 1950

2,517,998

UNITED STATES PATENT OFFICE 2,517,998

APPARATUS FOR DIFFUSING WATER IN EVAPORATION COOLERS

Harry R. Gilchrist, Jr., and Don Hagman Young, Phoenix, Ariz.

Application December 15, 1947, Serial No. 791,726

2 Claims. (Cl. 261—97)

The present invention relates to apparatus for diffusing water in evaporation coolers or the like. More particularly, it relates to a method and an arrangement whereby water may be supplied at a controlled rate and distributed uniformly to an evaporation zone where such water, in a dispersed state, may be caused to evaporate and cool a body of air passing through such evaporation zone.

In the prior art, numerous devices of various kinds have been developed for utilizing the latent heat of vaporization of water to cool and also to moisten a body of relatively dry air. In geographical areas where the atmospheric humidity is low, and during seasons when the temperature is relatively high, evaporative coolers have been found to be effective and efficient means for space cooling and for analogous application where moderate refrigeration is required. Such coolers are particularly suitable for cooling the air supply in buildings or rooms to make them more comfortable but they are used for other purposes also and it will be understood that the invention described hereinafter may have application to a wide range of purposes. In general, it is applicable wherever the cooling of air, for direct use or otherwise, is accomplished in whole or in part by water evaporation into such air.

A particularly useful and successful type of evaporation cooling is that which is accomplished by employing a moistened body having a large surface area which is contacted by a moving body of air. Porous or fibrous bodies, preferably those which are capable of a degree of self-moistening by capillary action, are arranged so that air may be passed over their surfaces and preferably through them so as to contact large moist areas. Relatively dry air to be cooled causes the moisture to evaporate from the contacted surfaces. The evaporation absorbs heat from the air and at the same time the air picks up moisture, increasing its relative humidity. The moisture removed from the moist porous or fibrous, or otherwise absorbent body, must be constantly replaced, and its replacement in an efficient manner is an object of the present invention.

A further object of the present invention is to use simple, inexpensive and efficient elements for conveying water and spreading it uniformly throughout the absorbent or porous body of large evaporative surface and to combine such elements in a convenient and compact manner. Still another object is to use moisture conveying means which are not subject to clogging or to corrosion due to the inorganic salts or other impurities commonly present in water.

The type of moistening device which is preferred in the present invention comprises a relatively thick, loose pad of fibrous material, such as wood excelsior or shavings, of large area, through which a body of moving air may be passed to absorb moisture and be cooled by the evaporative process. An additional object of this invention is to provide an improved means for supplying water uniformly throughout such a pad in a manner to insure highly effective evaporation and air cooling. Various arrangements have been used in the past for supplying water to such pads but they have not been altogether satisfactory and the present invention has a further and specific object the overcoming of such deficiencies as irregular or non-uniform moistening, rusting and corrosion of water conduits to the moistening pad, clogging of water supply orifices, excessive water supply with resulting damage to property, and the like.

Other and further objects will become apparent as this description proceeds and therefore reference will next be made to the accompanying drawings, wherein.

Figure 1:
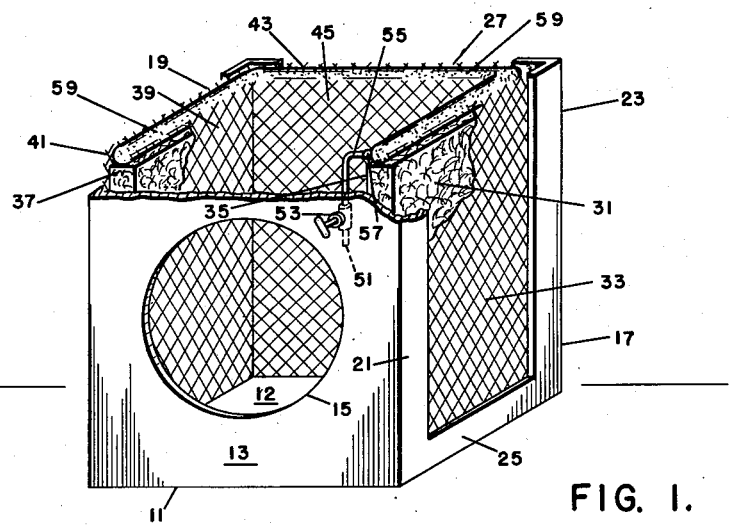
Fig. 1 is a perspective view of the air moistening chamber of a cabinet type evaporative cooler, the air supply means being omitted and certain other elements being omitted or broken away to show the construction more fully.

Referring first to Fig. 1 of the drawings, there is shown a framework or casing 11 which, as herein shown, is in the form of a generally rectangular cabinet. The casing or cabinet 11 may be nicely finished where it is employed as an exposed unit for space cooling, or it may be a rough unit for concealed or covered use. Its shape may be varied to suit its purpose, as will be obvious to those skilled in the art. As shown, the cabinet comprises a bottom wall 12 and four vertical side walls. A top or cover is provided but is not shown in the drawings to avoid concealing the construction of the moistening pad elements and the water distributing tube or conduit.

One wall of the cabinet, indicated at 13, is adapted to support the air supply means (not shown) which may be a conduit connected with a fan or blower, or may be a fan or blower directly connected to wall 13. For this purpose an opening 15 is provided. The wall 13 may be formed of any suitable rigid material such as sheet metal, plywood, lumber, plastic, or the like. Ordinarily the air will be forced by suitable blower or pressure means into the cabinet through opening 15, but it may flow in the opposite direction, being moistened as it enters the cabinet 11, if desired.

The casing 11, as shown, comprises side walls 17 and 19 and these are each designed to support a moistening pad. They each comprise a pair of vertical structural members of appropriate rigid material, wood, metal, or plastic, and a lower member supported by or attached to the bottom wall or floor 12. The vertical members are shown at 21, 23, and the lower horizontal member at 25.

The fourth vertical wall 27, shown at the rear of Fig. 1, may in normal use be the front wall of the cabinet 11. It is constructed in the same general manner as the side walls 17 and 19 to support a moistening pad which covers substantially all the area of said wall. Thus, as shown, the three walls 17, 19 and 27 support three pads which extend substantially continuously around three vertical sides of the cabinet. The wall 17 is provided with a pad, which is a porous, air-permeable body of lightly pressed fibrous material, such as wood excelsior, shown at 31. An outer grill or screen 33, of suitable material supports and reenforces the pad 31 and holds it in place. An inner grid or screen, made, for example of coarse wire screening material supports the inner side of pad 31. Both the outer grill 33 and the inner screen 35 should be of rust resistant material and where the cabinet is finished for exposed use it may be desirable to form the outer grill of attractive material for a good appearance.

The wall 19 is similarly provided with a moistening pad 37, like pad 31, similarly held in place by an inner support or screen element 39 and by an outer grill or the like 41. The wall member 27 has a similar pad 43 held in place by an inner grid element or screen 45 or the like and by an outer grill or screen (not shown) which is identical with or generally similar to the grills 33 and 41.

The construction described above with three vertical walls equipped with moistening pads is usually preferred, but it will be understood that one or two walls only will be equipped with pads, if desired for particular purposes. The cabinet 11 is provided with a top or cover which preferably is impervious (not shown) but which may also be equipped with a moistening pad where required for a special use.

It will be understood from the foregoing that in use the air to be moistened and cooled by the evaporation of water from the pads 31, 37 and 43 is caused to flow through such pads, suitable pressure being applied to the air by conventional means (not shown) to cause its circulation. It is desirable that the cooler be so arranged that substantially all of the air must pass through the pads and it is also desirable that the pads be moistened quite uniformly throughout so that all parts of the circulating air will be contacted and cooled.

As indicated above, difficulty has been encountered in the prior art in obtaining uniform moistening of the pads and the present invention affords an improved means and method for accomplishing such uniform moistening. As shown in Fig. 1, water for moistening the pads is brought from a suitable source, such as a city water supply, to an inlet pipe or tube 51. A valve 53 may be provided in the inlet pipe 51 to control or cut off the water supply as desired. Extending above the valve 53 is a pipe connection 55, which may be a rigid pipe or a flexible hose as desired. The member 55 attaches to a connecting nipple 57 fitted to a tubular water permeable conduit of relatively large diameter which extends continuously along the upper surface of the moistening pad assembly 31, 37, 43. This conduit, indicated at 59, is formed of a fibrous material, such as cotton, and is preferably formed of a woven fibrous material such as canvas of suitably heavy grade. The conduit material is of such texture, weave, and construction that water supplied to it under pressure oozes through its walls continuously throughout its length. Such devices have been sold to gardeners for watering lawns, flowers, etc., during recent years and are commonly called "soakers." They are admirably suited to the purposes of the present invention because they supply water at a uniform and controlled rate, which varies with the pressure applied, and they are not subject to rusting or corrosion as is the case with metal conduits. They are also less subject to clogging caused by deposition of inorganic salts such as are present in hard waters. Prior art devices such as metal tubes provided with minute perforations have often proved to be unsatisfactory for this type of service, due to clogging by the materials deposited by water. Since the permeable fabric conduits, such as conduit 59, are adapted to distribute water throughout their entire surface areas, they are not particularly subject to clogging by deposited minerals or the like.

The conduit 59 may be made in various ways and alternative constructions are indicated in Figs. 4 to 9, inclusive. One suitable construction is shown in detail in Figs. 4 and 5 where the conduit 59A is shown as a woven seamless tube. It may be knitted or woven of suitable textile material such as canvas or analogous woven fabric of appropriate grade. The grade or weight of fabric should be so chosen that the amount of water discharged under the available pressure is sufficient to keep the pads 31, 37, 43 continuously moist under operating conditions. By means such as the control valve 53, the supply of water to the conduit 59 or 59A may be limited as desired.

Figure 7:
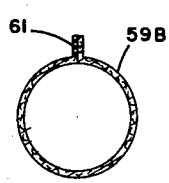
Fig. 7 is a vertical sectional view taken substantially on the line 7—7 of Fig. 6.
Figure 6:
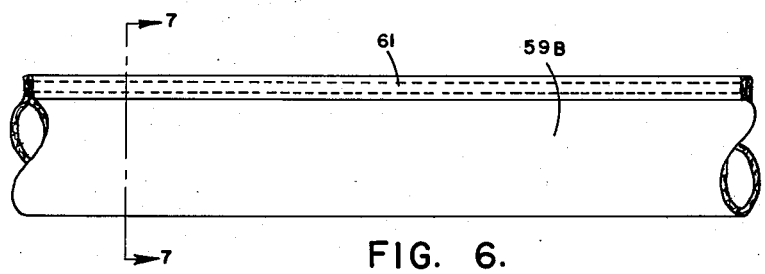
Fig. 6 is a fragmentary elevational view of another modification of the water supply or distributing tube.

An alternative type of conduit material is shown in Figs. 6 and 7 in the form of a sewed tube 59B having a single longitudinal seam 61. Such a conduit may be made by folding a flat sheet of canvas or other suitable fabric and sewing a flat seam. As in the case of the seamless tube of Figs. 4 and 5, the fabric should be chosen to supply the maximum moisture requirements under the pressure available. Quantities less than the maximum may be obtained by adjustment of the control valve 53. The conduit 59B, as well as conduit 59A, should be fitted with an appropriate connection such as nipple 57, Fig. 1.

Figure 9:
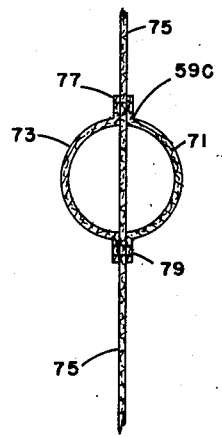
Fig. 9 is a vertical sectional view taken substantially on the line 9—9 of Fig. 8.
Figure 8:
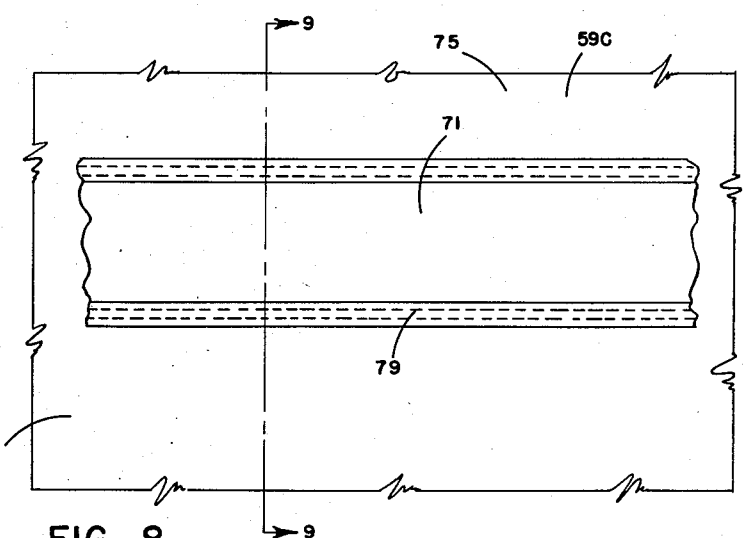
Fig. 8 is a fragmentary elevational view of still another modification of the water supply tube or conduit.

Still another form of conduit material is shown in Figs. 8 and 9. In this case the conduit is a dual conduit incorporating a fibrous sheet of one or more laminations of appropriate material such as burlap. The conduit, indicated at 59C, is formed of two outer sheets 71 and 73 of canvas or other appropriate fabric, chosen for suitable water permeability, and a central fibrous fabric having capillary properties which serves to spread the moisture over a wider area than that which can be contacted by the tube proper. By means of such a device a very thick pad can be moistened over its entire upper surface by providing sufficient width in the fibrous sheet 75. Alternatively, a distributing conduit such as the dual tube 59C of Figs. 8 and 9 may be placed against a vertical wall of a pad or pad assembly to moisten a substantial area thereof. In some cases a conduit such as 59C, equipped with an extending sheet which is moistened by capillary feed, may entirely replace the pad or pad assembly, since the element 75 may be sufficiently permeable to the air stream and capable of supplying sufficient moisture for evaporation and cooling. As a general rule, however, the tube assembly 59C will be used in combination with the usual relatively thick moistening pads of fibrous material, such as wood excelsior, which have a very large surface area, are moistened in part by capillary action, permit free air flow under light pressure, and provide substantial moistening and cooling effect.

Figure 2:
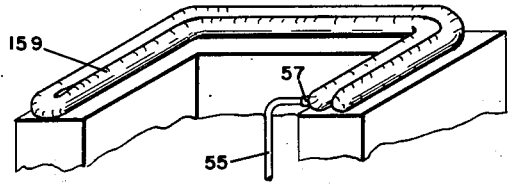
Fig. 2 is a fragmentary perspective view of the upper part of the evaporator pad assembly of Fig. 1, with a modified form of water distributing conduit assembled therewith.
Figure 3:
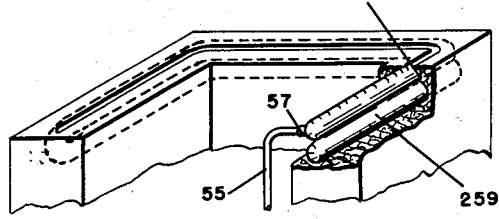
Fig. 3 is a fragmentary view similar to Fig. 2 but showing still another modification of the water distributing conduit, wherein the conduit is embedded in the evaporative pad.
Figure 5:
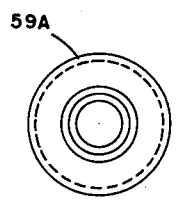
Fig. 5 is an end view of the tube or conduit of Fig. 4, taken from the left of said figure.
Figure 4:
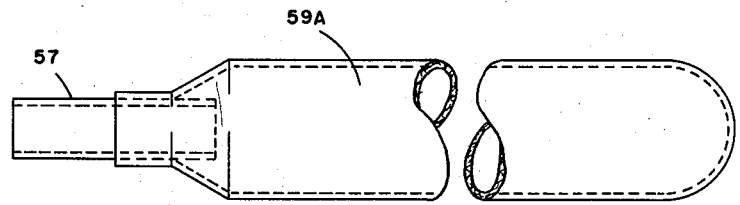
Fig. 4 is a fragmentary elevational view of one form of conduit construction suitable for use in the present invention, certain parts being broken away to show the construction more fully.

A distributing conduit assembly, such as 59C, Figs. 8 and 9, may be made by assembling and sewing the three layers, 71, 75, 73 in such a manner as to provide a tube which is substantially semicircular in cross section when distended on each side of the central capillary sheet 75. The sewed seams which hold the three layers together are shown at 77 and 79. The width of the sheets 71 and 73, which determine the effective diameter of the conduit, should be chosen so as to provide the desired maximum flow for the required length of the conduit, taking into consideration its permeability under the available water pressure. The conduit 59C, as well as the alternative forms 59A and 59B, may be used in various positions and may be merely in contact with the evaporation pad or pad assembly or may be embedded therein. In Figs. 2 and 3 there are shown certain modifications of the arrangement of the distributing conduit in relation to the moistening pad assembly. In Fig. 1 the conduit 59 is shown as merely a single turn of tubing along the top of the pad assembly. In Fig. 2, however, the conduit 159 is shown doubled back upon itself to provide a double run along the top of the pad assembly. The conduit 159 is twice as long as conduit 59, Fig. 1, and hence, other conditions being equal, would deliver twice as much moisture to the evaporative pads in a given period of time. Obviously the number of runs or turns of the conduit may be varied as desired and in this manner, as well as by choice of fabric, or adjustment of water supply pressure, the moisture supply and the consequent cooling effect, may be adjusted to meet any requirements. Although Fig. 2 shows just two turns or a doubling back of the conduit 159, it will be understood that the invention contemplates three, four, or more turns, depending upon the diameter of the tubing, its form (for example 59A, 59B, or 59C, Figs. 4 to 9), the thickness of the pad assembly, and the like. The conduit 159 may be laid on top of the pad assembly or embedded therein, as shown in Fig. 3, to be next described.

In Fig. 3 still another arrangement of the distributing conduit is shown wherein the tubing is arranged in multiple banks or turns arranged one above another. The tube 259, which may be constructed like any of the tubes 59A, 59B, or 59C, is shown doubled back on itself to provide two runs or turns but it will be understood that three, four or more runs can be provided if desired. As indicated in Fig. 3, the tubing may be embedded in the pads and where this is done the pads are preferably formed with suitable recesses, as indicated at 261. If desired, the conduit may extend more or less continuously from top to bottom of the pad and in some cases this may be accomplished by having the padding split vertically, or formed in two sections, with the conduit between. Enough space should be provided between turns of the conduit, of course, to permit the required air flow through the pad assembly.

Although the tubular conduit or "soaker" has been described above as being made, for example, of cotton fabric such as heavy canvas and the like, it will be understood that woven plastic materials or any membranous materials having suitable water permeability may be used for the water supply conduit. Numerous variations may be made in the materials, construction and arrangement of the conduit with respect to the pad or pad assembly, as will be apparent to those skilled in the art.

The invention has been shown and described in combination with a particular type of evaporative cooler, but it will be obvious that it may be applied to various evaporative cooler appliances. The essence of the invention is the use of a porous or water permeable conduit tube for conveying water to and distributing it uniformly through an evaporative cooler pad. The combination of an air permeable pad, having self-moistening properties by capillary action, and a water permeable distributing conduit for conveying water at a proper and controlled rate to all parts of the pad, may be obtained in various ways within the spirit of the present invention. It will be understood that the invention is not to be limited to the precise details shown in the drawings or described above since equivalent and obvious modifications are contemplated and included as a part of this invention.

What is claimed is:

1. Apparatus for moistening air in an evaporative type air cooler, comprising a series of three contiguously arranged air-pervious evaporating pads constituting three contiguous wall elements of a generally rectangular enclosure, a tubular conduit for supplying water uniformly to said pads, said conduit comprising a plurality of substantially U-shaped loops arranged parallel to each other and lying in water-transmitting contact with the upper portions of all of said pads, said conduit being in the form of a single continuous textile fabric tube of sufficient strength to withstand normal city water pressures and sufficiently pervious substantially throughout its surface area to keep all of said pads substantially moist under maximum evaporation conditions.

2. Apparatus as in claim 1 wherein said conduit is substantially embedded in said pads.

HARRY R. GILCHRIST, Jr.
DON HAGMAN YOUNG.

REFERENCES CITED

The following references are of record in the file of this patent:

UNITED STATES PATENTS

| Number | Name | Date |
|---|---|---|
| 2,184,833 | Dewey | Dec. 26, 1939 |
| 2,187,019 | De Mund et al. | Jan. 16, 1940 |